Feb. 18, 1936. E. V. AMY ET AL Re. 19,854

DUPLEX RADIO AERIAL SYSTEM

Original Filed Dec. 22, 1933 3 Sheets-Sheet 1

INVENTORS
Ernest V. Amy
and Julius G. Aceves
By Arthur J. Kent
their ATTORNEY

Feb. 18, 1936. E. V. AMY ET AL Re. 19,854

DUPLEX RADIO AERIAL SYSTEM

Original Filed Dec. 22, 1933 3 Sheets-Sheet 2

INVENTORS
Edward V. Amy
and Julius G. Maier
BY
Arthur W. Kent
their ATTORNEY

Feb. 18, 1936. E. V. AMY ET AL Re. 19,854

DUPLEX RADIO AERIAL SYSTEM

Original Filed Dec. 22, 1933 3 Sheets-Sheet 3

INVENTORS
Ernest V. Amy
& Julius G. Brown
BY
Arthur H. Adams
their ATTORNEY

Reissued Feb. 18, 1936 Re. 19,854

UNITED STATES PATENT OFFICE 19,854

DUPLEX RADIO AERIAL SYSTEM

Ernest V. Amy and Julius G. Aceves, New York, N. Y., assignors to Amy, Aceves & King, Inc., New York, N. Y., a corporation of New York Original No. 1,965,539, dated July 3, 1934, Serial No. 703,528, December 22, 1933. Application for reissue October 29, 1935, Serial No. 47,332

20 Claims. (Cl. 250—9)

This invention relates to radio receiving systems, and a principal object of the invention is to provide for both long and short wave reception, either alternatively or simultaneously by one or more receivers tuned to each band, and at the same time, so far as the downleads from the antenna are concerned, to avoid interference by local electrical equipment, such as sparking motors, electric refrigerators, elevator motors, etc., and to effect such reception of long and short wave signals through the same down-lead conductors. The part of the system which relates to long wave reception is in itself a feature of the present invention apart from the part relating to short wave reception.

With the advent of television and a constantly increasing demand for distant or foreign broadcast reception on wave lengths much shorter than those of the ordinary broadcast band of 200 to 600 meters, the problem of satisfactory noiseless reception of these wave lengths, as well as those within the broadcast band, becomes one of great importance.

The invention has been made more particularly for the reception of signals within the usual long wave broadcast band in this country of 0.5 to 1.5 megacycles, or 600 to 200 meters wave length, and those within the usual short wave broadcast band of 5 to 60 megacycles, or 60 to 5 meters wave length. The selection of these particular frequency bands is not to be construed as a limitation of the possibilities of the invention, but as serving to exemplify one of its most important applications for present-day broadcast reception. As the art develops, these bands may change considerably.

Three approved circuit arrangements according to the invention are shown diagrammatically, by way of example, in the accompanying drawings, in which.

Figure 1:
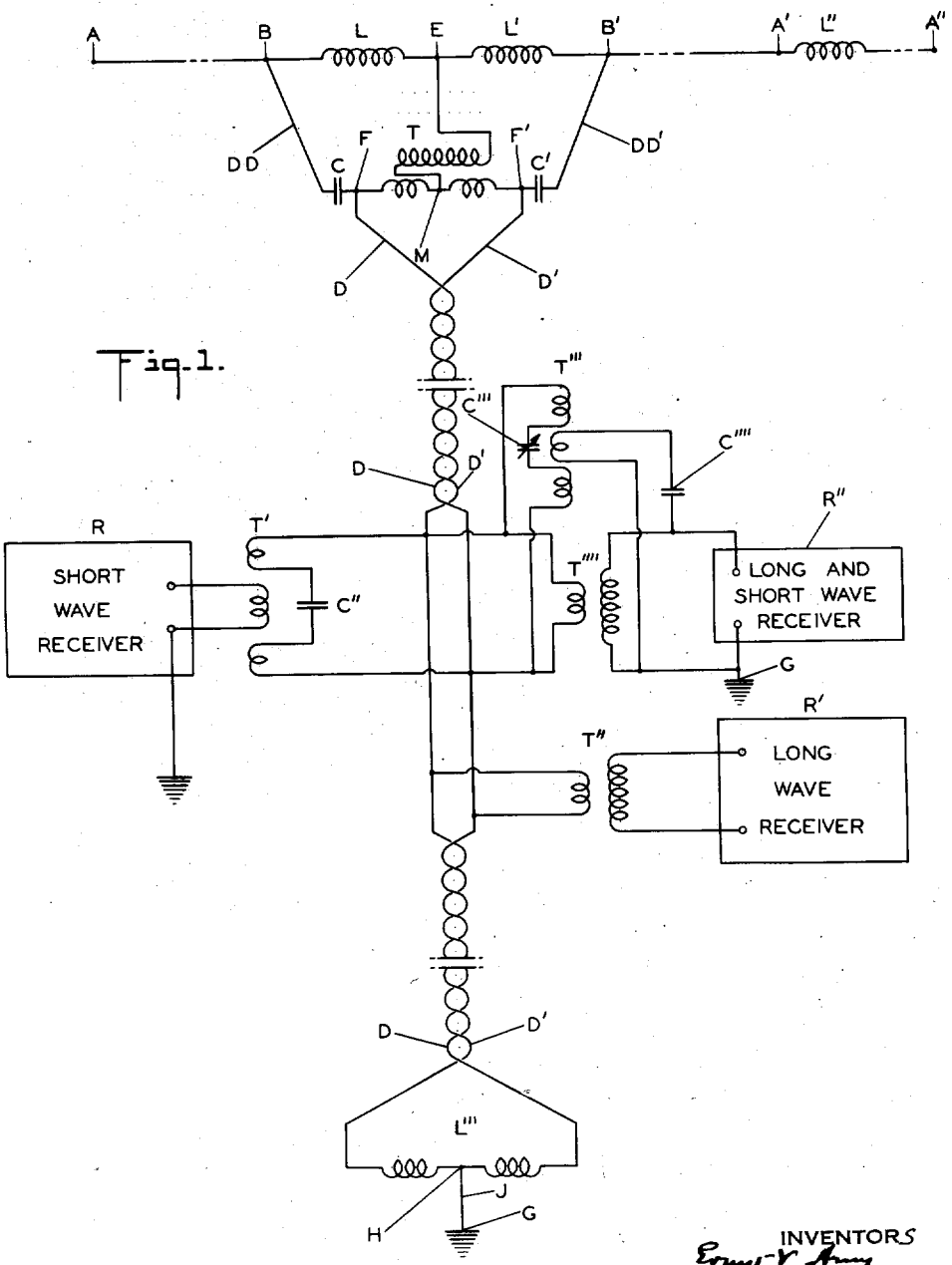
Fig. 1 shows a circuit diagram of a receiving system embodying the present invention.

As shown in Fig. 1, the short and long wave receivers R and R′ and the combination short and long wave receiver R″ receive current from an antenna A, A′, A″ by means of a downlead composed of two insulated conductors D and D′. The conductors D and D′ are most desirably twisted together both for convenience and also to insure equalization of the effects of any induced potential on the two conductors. The downlead conductors D and D′ are connected by conductors DD and DD′ to electrically spaced points B and B′ on the antenna for the reception of short wave signal current. For long wave signal current, the conductors are indirectly connected to the antenna through a transformer T, one end of the primary coil of which is connected to the antenna at E, and the other end of the primary being connected to the mid-point M of the secondary of the transformer. The secondary of the transformer is connected across the conductors D, D′, making connection therewith at the points F and F′.

Short wave reception in the present system is based on a difference in potential between two parts of the antenna, and hence the points B and B′ are spaced apart to give a potential drop between them. Desirably the portion A, A′ of the antenna is of the half wave length doublet, or dipole, type, and the distance BB′ depends upon the impedance of the antenna between these two points and that of the two downlead conductors D and D′ and the connecting conductors DD and DD′. As shown, there are two inductances L and L′, having a high impedance for short wave signal current and a low impedance for long wave signal current, inserted between the points B and B′ to enable these points to be brought close together while leaving them spaced apart so far as their electrical relationship is concerned. If such inductances are not used, the distance BB′ depends substantially wholly upon the impedance of the conductors D and D′ and the conductors DD and DD′. For a 400 to 500 ohm line, this distance should be about one-sixth of the length of the antenna AA′ when such length equals one-half of the average short wave length. Instead of inserting inductance in the antenna to reduce the spacing of the points of connection of the conductors DD and DD′, the antenna may be made in two sections insulated from each other except through the conductors DD and DD′ and through the transformer T and one of said conductors.

Since for long wave reception it is frequently desired to use an antenna longer than an average short wave doublet antenna, the antenna may be, and most desirably should be, extended, as indicated, to a point A″. In order to limit the effective length of the antenna for short waves, the extension to the point A″ is desirably connected to the part A, A′ through an inductance L″.

Condensers C and C′ are connected in the connecting conductors DD and DD′ between the points B and F and the points B′ and F′ respectively for the purpose of preventing short-circuiting of the secondary of the transformer T through the circuit F, B, L, E, L′, B′, F′. Capacity couplings are thus provided between the downlead conductors and the points B and B′ of the antenna. The condensers C and C′ are ordinarily of about 100 micro-micro-farad capacity each.

The short wave receiver R is fed by a coupling transformer T′ having its primary connected across the downlead conductors D and D′. The circuit for the transformer T′ includes a condenser C″ serving primarily the purpose of a filter to substantially exclude long wave currents.

The short wave currents flow from the di-pole antenna down the capacity coupling DD and the conductor D to the transformer T′ and back up the conductor D′ and the capacity coupling DD′ and vice versa. As the signal current flows at any instant in opposite directions in the two conductors and the conductors are close together, any potential induced therein by an external source, such as an electric refrigerator, will have equal and opposite effects on the flow of signal current through the two wires. These effects will neutralize each other.

The long wave receiver R′ is fed by a coupling transformer T″, the primary of which is connected across the downlead conductors D and D′. The inductance of this transformer is high enough to substantially exclude any short wave current. The long wave current from the antenna as a whole flows from the secondary of the transformer T down one of the conductors D or D′ to the transformer T″ and back up the other conductor D′ or D. Hence, as in the case of the short wave currents, the effects of any induced potentials produced by an external source will neutralize each other. As the currents generated in the two downlead conductors will flow in the safe direction in both of the conductors, they will produce no electro-motive force in the secondary windings of either of the coupling transformers T′ and T″.

Long wave reception in the present system is based on a difference in potential between the antenna as a whole and the ground. For this reason, current must be permitted to flow through the primary of the transformer T from the antenna to the ground and back. As shown in Fig. 1, this current enters the secondary of the transformer T at the point M and divides part flowing through one-half of the secondary and down conductor D and the other part flowing through the other half and down conductor D′. As these components of the current flow in opposite directions through the secondary of T, they do not affect the signal current induced in the secondary; and this divided current flowing in the same direction in the two conductors D and D′ is without effect on any signal current flowing in opposite directions through the conductors, and because of their going into the windings of the coupling transformers T′, T″ in opposite directions, they can produce no electromotive force in the secondary windings of either of these transformers. At the ground end a center tapped coil L‴ is connected across the downlead conductors D and D′ and the midpoint of this coil is connected by a lead J to the ground G. Such a coil may be inserted in other locations between the downleads either in addition to or in place of the coil between the lower end of the downleads, as shown. The current from the primary of the transformer T flows through the two halves of this impedance L‴, unites at H and flows to ground through the lead J.

The coil L‴ is designed and constructed so that it offers very low impedance to currents flowing through the two halves in opposite directions but offers a high impedance to current flowing through the two halves in the same direction. Hence, so far as the current flowing to and from the primary of the transformer T to ground is concerned, the effect of potentials induced in D and D′ by external agencies, such as house electrical disturbances, will be negligible. This result follows from the fact that any tendency for the potential in such line to change as a whole as a result of such external agencies will be followed by a flow of current up or down both conductors simultaneously in the same direction, thereby neutralizing any changes in potential which might otherwise be produced. In other words, the end of the primary of transformer T connected to the point M is substantially at ground potential at all times, irrespective of the effects of external agencies on the two downlead conductors. That being so, the potential across the terminals of the primary T is independent of the action of external agencies on the conductors D and D′.

Any currents which may be generated in the conductors D and D′ by any potential-inducing outside agency will not affect either receiver, since the coupling transformers which feed the receivers will deliver energy from their secondary windings only when currents flow in opposite directions in the conductors which feed the primaries, and will not deliver energy when such currents flow in the same direction in the conductors. Interference is thus neutralized, and the signal waves which travel in opposite directions in the two downlead conductors are allowed to pass through the primaries of the coupling transformers to cause energy to be delivered to the receivers from the secondary windings of the transformers.

To sum up, the flow of current through the secondary of the transformer T is unaffected by external potential-inducing agencies since the induced effects in the two conductors D and D′ neutralize each other and the flow of current through the primary of transformer T is substantially unaffected as any potential-inducing agencies acting on the conductors D and D′ cannot appreciably raise or lower the potential of the conductors D and D′ as a unit, for the reason that, since the impedance of L‴ is practically zero for currents induced simultaneously in both downleads in the same direction, the two conductors as a whole are at ground potential.

The receiver R″ is a receiver of the type in which its circuit characteristic may be changed by a switch so as to enable it to be tuned in to receive either long or short wave signals. This receiver is connected to the downlead conductors D and D′ by two transformers T‴ and T⁗ connected in parallel. The transformer T‴ corresponds to the transformer T′ for the short wave receiver R and is provided with a variable condenser C‴ serving the same function as the condenser C″.

As the two secondary windings of the transformers T‴ and T⁗ are connected in parallel to a single receiver, a condenser C⁗ is arranged in series with the short wave coupling transformer T‴ to prevent the secondary winding of this transformer from short-circuiting the long wave currents. The leakage reactance of the long wave transformer is sufficient to prevent the short-circuiting of the short wave currents by the long wave transformer.

The transformer T''' plus the receiver R'' forms a short wave receiving unit, and the transformer T'''' plus the receiver R'' forms a long wave receiving unit; and hence, while such units have elements in common, they are functionally the equivalent of the two separate coupling transformer and receiver units T'R and T''R' and are to be so regarded where reference is made both in this specification and in the claims to short and long wave receivers. Other forms of receiving units having elements in common, as well as receiving units capable of tuning in on both short and long wave signals, are likewise to be regarded as the equivalents of wholly separate receiving units.

Figure 2:
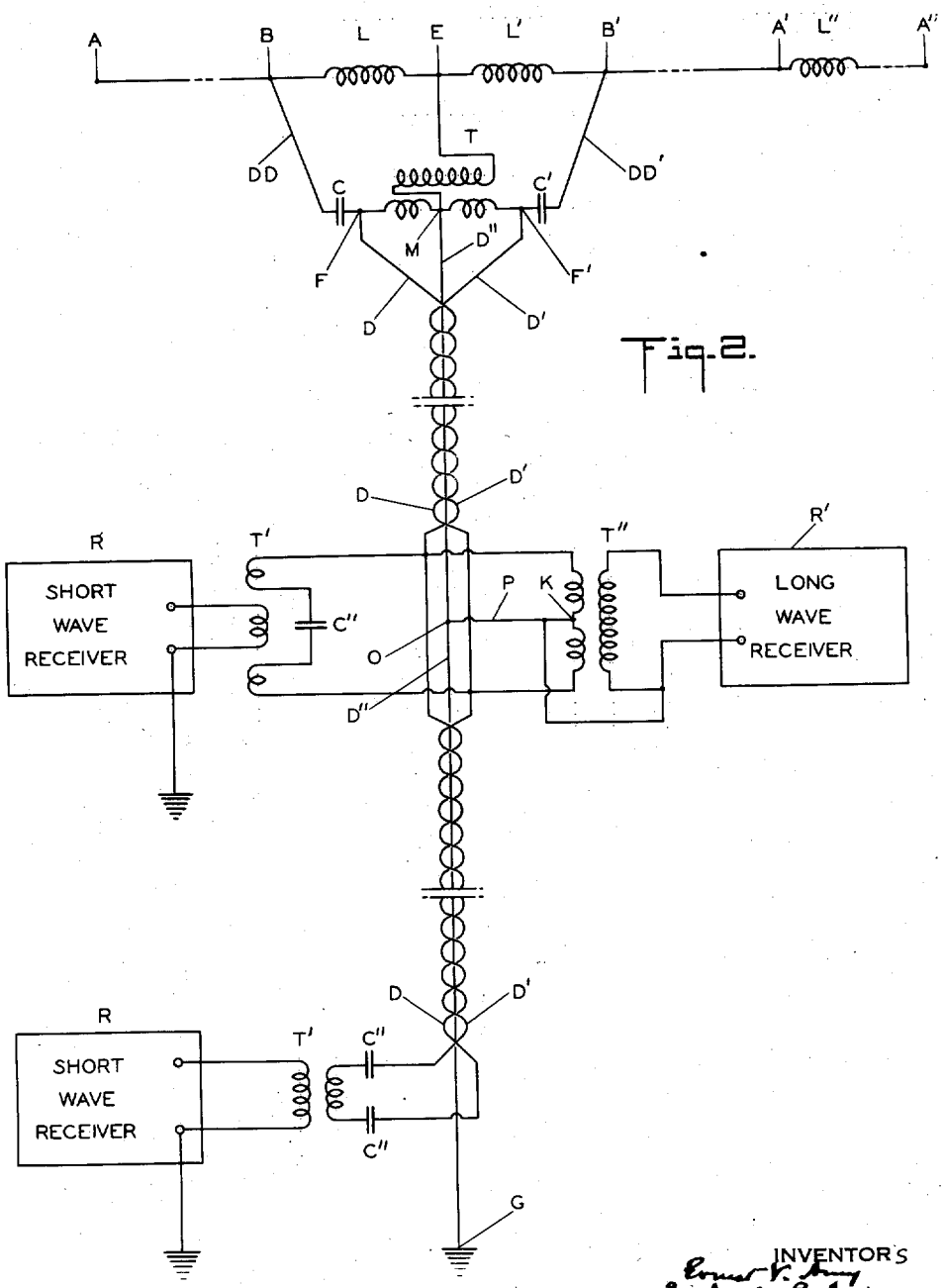
Fig. 2 shows a circuit diagram of a modification of the system shown in Fig. 1.

The receiving system shown in Fig. 2 is similar to that shown in Fig. 1. In Fig. 2, however, the center-tapped impedance L''' connected across the ground ends of the conductors D and D' is omitted and a third downlead conductor D'' is used extending from the end of the primary coil of transformer T to ground. In the specific arrangement shown, this conductor D'' is connected to the mid-point M of the secondary of the transformer T to the ground G. In this embodiment of the invention the current to and from the primary T flows through the downlead conductor D''.

The possible effects of potentials induced in D'' by house electric currents and the like are substantially eliminated as the result of the fact that such conductor is grounded and is of relatively low impedance with respect to long wave currents, and is thereby effectively at ground potential.

If desired, the mid-point K of the primary of the coupling transformer T'' may be connected by a lead P to a point O on the downlead conductor D'' so as to provide a ground for the point K. When the point K is so grounded the section of the conductor D'' between M and O may be omitted. In that case the current from the primary of the transformer T divides at M, flows through the two halves of the secondary down the conductors D and D', through the two halves of the primary of the coupling transformer T'', unites at K and flows to ground G through the lead P and the remaining portion of the downlead conductor D''. The flow of such current through the two halves of the primary of the coupling transformer being in opposite directions has no effect on the flow through the secondary of such transformer of current induced therein by the signal current flowing in the same direction through both halves of the primary, and hence does not affect the signal reception in any way.

The conductor D'' may be in the form of a metallic tube or woven network of wires surrounding the conductors D and D' and insulated therefrom, thereby shielding them from any external electric field. Even if D'' is merely a wire, it has some shielding effect. When, however, the double conductor system shown is used, a shield is ordinarily unnecessary, as the effects of any induced potential are for all practical purposes neutralized. Most conveniently, therefore, the downlead consists of three insulated wires (or two in case D'' between M and O is omitted) twisted together. For clearness, the drawings show only D and D' twisted, but in practice all three wires are twisted together.

Figures 3, 4:
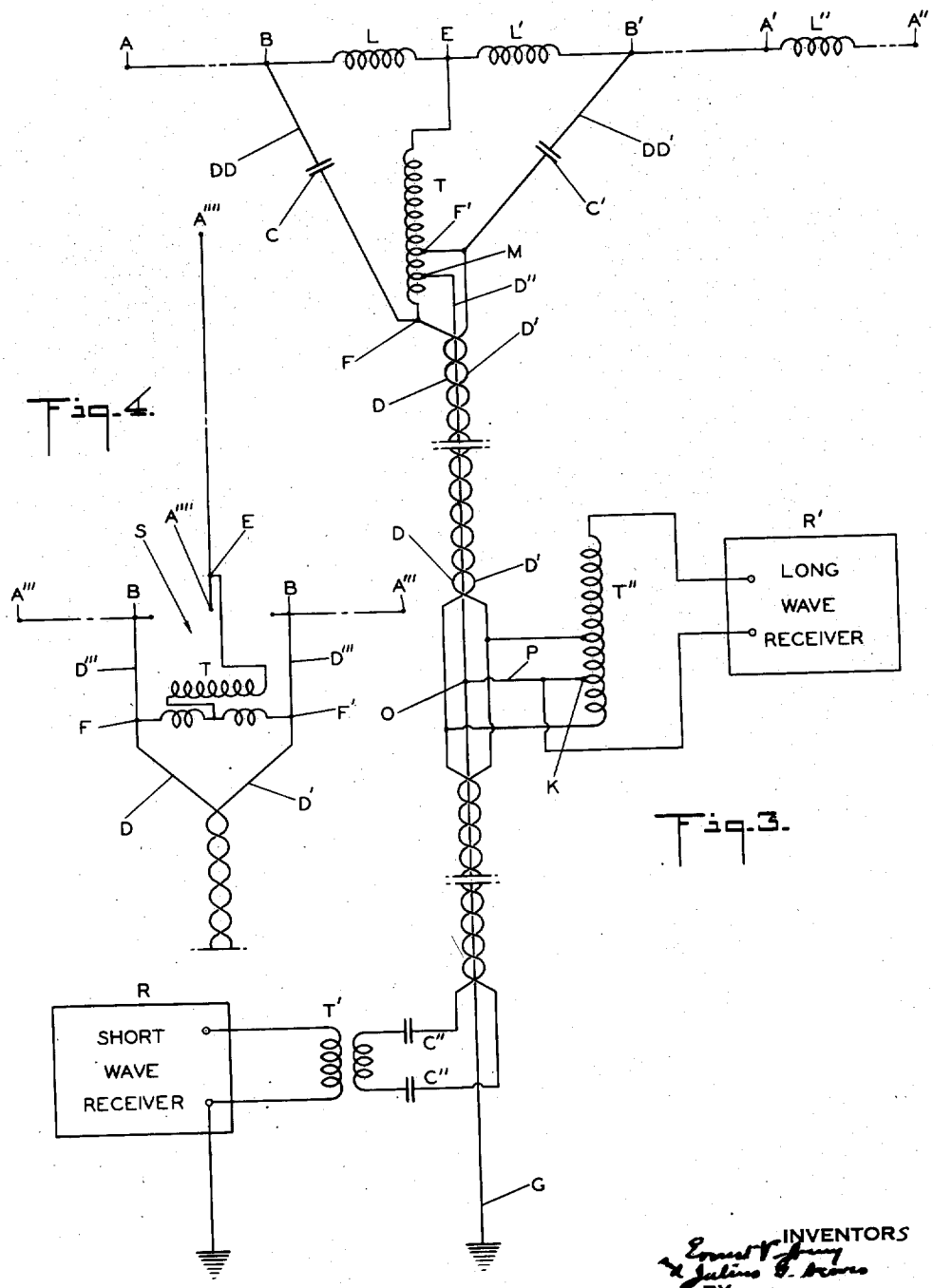
Fig. 3 shows a circuit diagram of a modification of the system shown in Fig. 2.
Fig. 4 shows a circuit diagram of a further modification of the system shown in Fig. 1.

Fig. 3 shows a receiving system similar to that of Fig. 2, except that auto transformers are used adjacent the antenna and in the long wave receiver transformer circuit. The auto transformer adjacent the antenna should be of such type that the tap to ground for the primary is at the mid-point of the secondary, as shown, so that the potentials in the two downleads at any instant are equal and opposite. To further insure this condition, the coupling between the two halves of the secondary of transformer T and of the primary of transformer T'' should be as near unity as practicable.

Fig. 4 shows a receiving system similar to that of Fig. 1 except that two antennae are used, one A''' A''', for short wave signals, and the other, A'''' A'''', for long wave signals. The two antennae are to advantage so positioned relatively to each other that there is substantially no coupling between them, whether by capacity or induction. This result is conveniently obtained by placing the two antennae at right angles to each other. The short wave antenna is electrically broken in the middle at S, the adjacent ends of the two parts being connected by an insulator or supported independently as desired.

With the double antenna system above described there is no necessity for capacity couplings between the points B and F and the points B' and F' to prevent the passage of long wave current since short-circuiting of the secondary of the transformer T is prevented by the break in the short wave antenna at S. Consequently the capacity couplings provided by the conductors C and C' in the connecting conductors DD and DD' of Fig. 1 may be replaced by plain non-capacity couplings D''', D''', as shown.

If desired, all the downlead conductors in either Figs. 1, 2, 3 or 4 may for mechanical or other reasons be enclosed in a grounded metallic or a non-metallic sheath or casing.

With any of the forms of circuit shown there may be a plurality of receivers, either long wave receivers or short wave receivers, or those which receive both long and short wave signals, and if the coupling transformers are loosely coupled the tuning of one of the receivers will not appreciably affect the tuning of the others. The circuit shown in Fig. 1 has the advantage that it is simpler and cheaper than the construction shown in Fig. 2, and this is especially so where a large number of receivers are to be operated from a single antenna, as in the case of an apartment house or hotel.

The double transformer single receiver arrangement T''', T''', R'' may be used with circuits such as shown in Figs. 2 and 3.

What is claimed is:

1. A radio receiving system for short wave and long wave signals, comprising signal pick up means, a pair of downlead conductors, means for causing a rise or fall in potential in said pick up means due to long wave signals to produce a potential rise in one downlead conductor and a simultaneous potential fall in the other downlead conductor, and means for transferring to said downleads potential differences between electrically spaced points in said pick up means due to short wave signals, whereby circulating long wave signal currents and circulating short wave signal currents are produced in said downleads.

2. A radio receiving system for short wave and long wave signals, comprising signal pick up means, a pair of downlead conductors, a coupling transformer having its primary connected across the downlead conductors for feeding a long wave receiver, a coupling transformer for feeding a short wave receiver having its primary connected across the downlead conductors by a branch circuit including a condenser for substantially preventing passage of long wave current, means for causing a rise or fall in potential in said pick up means due to long wave signals to produce a potential rise in one downlead conductor and a simultaneous potential fall in the other downlead conductor, and means for transferring to said downleads potential differences between electrically spaced points in said pick up means due to short wave signals, whereby circulating long wave signal currents and circulating short wave signal currents are produced in said downleads.

3. A radio receiving system for short wave and long wave signals, comprising an antenna, a pair of downlead conductors, a transformer for long wave current adjacent the antenna the primary of which is connected to the antenna and to ground and the secondary of which is connected across the upper ends of the downlead conductors to supply long wave current therethrough to a long wave receiver, and capacity couplings between the upper ends of the downlead conductors and electrically spaced points on the antenna to supply short wave current through the downlead conductors to a short wave receiver, the capacity of said couplings being sufficient to prevent substantial short-circuiting of the secondary of said transformer.

4. A radio receiving system for short wave and long wave signals, comprising an antenna, a pair of downlead conductors, a transformer for long wave current adjacent the antenna the primary of which is connected to the antenna and to ground and the secondary of which is connected across the upper ends of the downlead conductors to supply long wave current therethrough to a long wave receiver, capacity couplings between the upper ends of the downlead conductors and electrically spaced points on the antenna to supply short wave current through the downlead conductors to a short wave receiver, the capacity of said couplings being sufficient to prevent substantial short-circuiting of the secondary of said transformer, and coupling transformers in circuits connected across said downlead conductors for feeding long wave and short wave receivers, the circuit for the short wave transformer including a condenser to substantially prevent passage of long wave current and the circuit for the long wave transformer having sufficiently high inductance to substantially prevent passage of short wave current.

5. A radio receiving system for short wave and long wave signals, comprising an antenna, a pair of downlead conductors, a transformer for long wave current adjacent the antenna the primary of which is connected to the antenna and to ground and the secondary of which is connected across the upper ends of the downlead conductors to supply long wave current therethrough to a long wave receiver, capacity couplings between the upper ends of the downlead conductors and electrically spaced points on the antenna to supply short wave current through the downlead conductors to a short wave receiver, the capacity of said couplings being sufficient to prevent substantial short-circuiting of the secondary of said transformer, coupling transformers in circuits connected across said downlead conductors for feeding long wave and short wave receivers, the circuit for the short wave transformer including a condenser to substantially prevent passage of long wave current and the circuit for the long wave transformer having sufficiently high inductance to substantially prevent passage of short wave current, and a ground connection to the mid-point of the primary of the long wave coupling transformer.

6. A radio receiving system for short wave and long wave signals, comprising an antenna, a pair of downlead conductors, a transformer for long wave current adjacent the antenna the primary of which is connected at one end to the antenna and at the other end to the mid-point of the secondary of the transformer the secondary of the transformer being connected across the upper ends of the downlead conductors to supply long wave current therethrough to a long wave receiver, capacity couplings between the upper ends of the downlead conductors and electrically spaced points on the antenna to supply short wave current through the downlead conductors to a short wave receiver, the capacity of said couplings being sufficient substantially to prevent short-circuiting of the secondary of said transformer, coupling transformers in circuits connected across said downleads for feeding long wave and short wave receivers, the circuit for the short wave transformer including a condenser to substantially prevent passage of a long wave current and the circuit for the long wave transformer having sufficiently high inductance to prevent substantial passage of short wave current, and a connection to ground from the mid-point of the primary of the long wave coupling transformer.

7. A radio receiving system for short wave and long wave signals, comprising an antenna, a pair of downlead conductors, a transformer for long wave current adjacent the antenna the primary of which is connected at one end to the antenna and at the other end to the mid-point of the secondary of the transformer the secondary of the transformer being connected across the upper ends of the downlead conductors to supply long wave current therethrough to a long wave receiver, capacity couplings between the upper ends of the downlead conductors and electrically spaced points on the antenna to supply short wave current through the downlead conductors to a short wave receiver, the capacity of said couplings being sufficient substantially to prevent short-circuiting of the secondary of said transformer, an inductive impedance connected across the downlead conductors, and a ground connection to the mid-point of said impedance, whereby the current through the primary of the first transformer will pass through the two downlead conductors and through the two halves of said impedance to said ground connection which act in parallel opposing while for signal currents they will be in series aiding.

8. A radio receiving system for short wave and long wave signals, comprising an antenna, a pair of downlead conductors, a transformer for long wave current adjacent the antenna one end of the primary of which is connected to the antenna and the secondary of which is connected across the upper ends of the downlead conductors to supply long wave current therethrough to a long wave receiver, capacity couplings between the upper ends of the downlead conductors and electrically spaced points on the antenna to supply short wave current through the downlead conductors to a short wave receiver, the capacity of said couplings being sufficient substantially to prevent short-circuiting of the secondary of said transformer, and a third conductor connecting one end of the primary of said transformer to ground.

9. A radio receiving system for short and long wave signals, comprising two antennae, one to pick up long wave signals and the other being a dipole short wave antenna and being broken electrically near its center, a pair of downlead conductors, a transformer for long wave current having its primary connected to the first antenna and to ground the secondary of said transformer being connected across the upper ends of the downlead conductors to supply long wave current therethrough to a long wave receiver, and electrical connections between the two parts of the second antenna and the upper ends of the downleads to carry short wave current from such antenna through the downlead conductors to a short wave receiver.

10. A radio receiver system as in claim 9, in which the two antennae are positioned so as to have substantially no coupling.

11. In a radio receiving system for short wave and long wave signals, comprising an antenna, a pair of downlead conductors, a transformer the secondary of which is connected across the upper ends of said conductors and the primary of which is adapted to be connected to the antenna and to ground, means for providing capacity couplings from the upper ends of said conductors to spaced points on an antenna, and coupling transformers connected across said conductors for feeding long wave and short wave receivers, the short wave coupling transformer having its primary connected in a branch circuit including a condenser for substantially preventing passage of long wave current.

12. A radio receiving system for short wave and long wave signals, comprising: an antenna, a pair of downlead conductors, means for causing a rise or fall in potential of said antenna with respect to ground due to long wave signals to impress a signaling voltage between said downlead conductors, and means for transferring to said downleads potential differences between electrically spaced points in said antenna due to short wave signals, whereby circulating long wave currents and circulating short wave currents are produced in said downleads.

13. A radio receiving system for short wave and long wave signals, comprising: an antenna of the dipole type, a pair of downlead conductors, means for causing a rise or fall in potential of said antenna with respect to ground due to long wave signals to impress a signaling voltage between said downlead conductors, and means for transferring to said downleads, potential differences between electrically spaced points in said antenna due to short wave signals, whereby circulating long wave currents and circulating short wave currents are produced in said downleads.

14. A radio receiving system for short wave and long wave signals, comprising: an antenna of the dipole type having at least a pair of arms, an impedance connected between the arms of said antenna, a pair of downlead conductors, a connection to ground from said antenna, means for causing a rise or fall in potential of said antenna with respect to ground, due to long wave signals to impress a signaling voltage between said downlead conductors, and means for transferring to said downleads potential differences between electrically spaced points in said antenna due to short wave signals, whereby circulating long wave signal currents and circulating short wave signal currents are produced in said downleads.

15. A radio receiving system for short wave and long wave signals, comprising: an antenna of the dipole type having at least a pair of arms, a pair of downlead conductors, means including an inductive coupling between the arms of said antenna and said downleads for causing a rise or fall in potential of said antenna with respect to ground due to long wave signals to impress a signaling voltage between said downlead conductors, and means for transferring to said downleads potential differences between the arms of said antenna due to short wave signals, whereby circulating long wave signal currents and circulating short wave signal currents are produced in said downleads.

16. A radio receiving system for short wave and long wave signals, comprising: an antenna of the dipole type having at least a pair of arms, a pair of downlead conductors, means including a transformer having a secondary winding connected to said downleads and a primary winding included in a connection extending from said antenna to an intermediate point on said secondary winding for causing a rise or fall in potential of said antenna with respect to ground due to long wave signals to impress a signaling voltage between said downlead conductors, and means for transferring to said downleads, potential differences between the arms of said antenna due to short wave signals, whereby circulating long wave signal currents and circulating short wave signal currents are produced in said downleads.

17. A radio receiving system for short wave and long wave signals, comprising: an antenna of the dipole type, a pair of downlead conductors, means including said downlead conductors for coupling said antenna to a radio receiver, for causing a rise or fall in potential of said antenna with respect to ground due to long wave signals to impress a signaling voltage on the receiver; and means including said downlead conductors for transferring to the receiver, potential differences between electrically spaced points on said antenna due to short wave signals.

18. A radio receiving system for short wave and long wave signals, comprising: an antenna of the dipole type, a pair of downlead conductors, means coupling said antenna to said downleads for causing a rise or fall in potential of said antenna with respect to ground due to long wave signals to impress a signaling voltage between said downlead conductors, means for transferring to said downleads, potential differences between electrically spaced points in said antenna due to short wave signals, and means for coupling said downleads to a radio receiver, said means including a coupling responding most effectively at said short waves, a coupling responding most effectively at said long waves, and a condenser for increasing the transfer of signaling energy through both of said couplings.

19. A radio receiving system for short wave and long wave signals, comprising: an antenna of the dipole type, a pair of downlead conductors, means coupling said antenna to said downleads for causing a rise or fall in potential of said antenna with respect to ground due to long wave signals to impress a signaling voltage between said downlead conductors, means for transferring to said downleads potential differences between electrically spaced points in said antenna due to short wave signals, and means for coupling said downleads to a radio receiver, said means including a short wave transformer, a long wave transformer, and a condenser connected in series with a winding of said short wave transformer for increasing the transfer of signaling energy at both long and short waves through said transformers respectively.

20. A radio receiving system for short wave and long wave signals, comprising: an antenna of the dipole type, a pair of downlead conductors, means coupling said antenna to said downleads for causing a rise or fall in potential of said antenna with respect to ground due to long wave signals to impress a signaling voltage between said downlead conductors, means for transferring to said downleads potential differences between electrically spaced points in said antenna due to short wave signals, and means for coupling said downleads to a radio receiver, said means including a short wave transformer and a long wave transformer, each having a primary winding, a circuit between said downleads containing a condenser in series with said short wave transformer primary, and means connecting said long wave transformer primary across at least the condenser portion of said circuit, for increasing the transfer of signaling energy at both long and short waves through said transformers respectively.

ERNEST V. AMY.
JULIUS G. ACEVES.